(12) United States Patent
Bond et al.

(10) Patent No.: US 11,881,985 B1
(45) Date of Patent: Jan. 23, 2024

(54) AUTOMATED RECOVERY OF APPLICATIONS FOR NETWORK FAILURES

(71) Applicant: Wells Fargo Bank, N.A., San Francisco, CA (US)

(72) Inventors: Caleb M Bond, Cottage Grove, MN (US); Lawrence S. Dickerson, Davidson, NC (US); William C. Cater, Fort Mill, SC (US); Jeffrey W. Sooy, St. Paul, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/060,477

(22) Filed: Nov. 30, 2022

Related U.S. Application Data

(62) Division of application No. 17/497,459, filed on Oct. 8, 2021.

(51) Int. Cl.
*H04L 41/0654* (2022.01)
*H04L 67/1097* (2022.01)
*H04L 41/0604* (2022.01)
*H04L 41/069* (2022.01)

(52) U.S. Cl.
CPC ........ *H04L 41/0654* (2013.01); *H04L 41/069* (2013.01); *H04L 41/0627* (2013.01); *H04L 67/1097* (2013.01)

(58) Field of Classification Search
CPC ............. H04L 41/0654; H04L 41/0627; H04L 41/069; H04L 67/1097
See application file for complete search history.

(56) References Cited

U.S. PATENT DOCUMENTS

| | | | |
|---|---|---|---|
| 6,182,086 B1 | 1/2001 | Lomet et al. | |
| 7,409,586 B1* | 8/2008 | Bezbaruah | G06F 11/0793 |
| | | | 714/13 |
| 7,707,455 B2 | 4/2010 | Anand et al. | |
| 7,840,673 B1 | 11/2010 | O'Crowley | |
| 8,667,096 B2 | 3/2014 | DeHaan et al. | |
| 9,836,365 B2 | 12/2017 | Ray | |

(Continued)

OTHER PUBLICATIONS

Final Office Action from U.S. Appl. No. 17/497,459 dated Feb. 7, 2023, 7 pp.

(Continued)

*Primary Examiner* — Viet D Vu
(74) *Attorney, Agent, or Firm* — Shumaker & Sieffert, P.A.

(57) ABSTRACT

A centralized application management computing system is described that is configured to generate digital dog tag files for local storage on each computing device of a plurality of computing devices (e.g., data center servers) within the enterprise network. The computing system is configured to periodically retrieve, from one or more sources within the enterprise network, application information for one or more applications hosted on a given computing device of the plurality of computing devices. The computing system is configured to periodically generate, based on the application information, a digital dog tag file for the given computing device that includes recovery information for the one or more applications hosted on the given computing device. The computing system is further configured to send the digital dog tag file for local storage at a predefined location on the given computing device.

19 Claims, 5 Drawing Sheets

(56) References Cited

U.S. PATENT DOCUMENTS

| | | | |
|---|---|---|---|
| 9,960,974 | B2 | 5/2018 | Bai et al. |
| 10,268,549 | B2 | 4/2019 | Deng et al. |
| 2007/0233699 | A1 | 10/2007 | Taniguchi et al. |
| 2008/0136648 | A1* | 6/2008 | Endrikhovski ...... G06Q 10/087 340/10.42 |
| 2011/0161318 | A1 | 6/2011 | Lyon et al. |
| 2018/0097711 | A1 | 4/2018 | Nallabothula et al. |
| 2019/0073276 | A1 | 3/2019 | Yuen et al. |
| 2021/0303413 | A1* | 9/2021 | Chopra ............... G06F 11/1435 |

OTHER PUBLICATIONS

Response to Office Action dated Sep. 22, 2022 from U.S. Appl. No. 17/497,459, filed Jan. 23, 2023, 11 pp.

ManageEngine. "Application discovery and dependency Mapping (ADDM)," Accessed on Apr. 30, 2021 from https://www.manageengine.com/products/applications_manager/application-discovery-dependency-mapping.html, 2 pp.

Microsoft. "Using Service Map solution in Azure," Retrieved from https://docs.microsoft.com/en-us/azure/azure-monitor/vm/service-map. See highlighted sections, Aug. 24, 2019, 45 pp.

Office Action from U.S. Appl. No. 17/497,459 dated Sep. 22, 2022, 8 pp.

U.S. Appl. No. 17/497,459, filed Oct. 8, 2021, naming inventors Bond et al.

VMware. "Datacenter Operational Excellence Through Automated Application Discovery & Dependency Mapping," Accessed on Apr. 30, 2021 from https://www.vmware.com/content/dam/digitalmarketing/vmware/en/pdf/products/vmware-datacenter-automated-application-discovery-dependency-mapping-whitepaper.pdf. See highlighted sections, 9 pp.

Response to Final Office Action dated Feb. 7, 2023 from U.S. Appl. No. 17/497,459, filed May 8, 2023, 12 pp.

Advisory Action from U.S. Appl. No. 17/497,459 dated May 24, 2023, 4 pp.

Office Action from U.S. Appl. No. 17/497,459 dated Jun. 26, 2023, 9 pp.

Response to Office Action dated Jun. 26, 2023 from U.S. Appl. No. 17/497,459, filed Sep. 26, 2023, 12 pp.

Notice of Allowance from U.S. Appl. No. 17/497,459 dated Oct. 17, 2023, 5 pp.

* cited by examiner

AUTOMATED RECOVERY OF APPLICATIONS FOR NETWORK FAILURES

This application is a divisional filing of U.S. patent application Ser. No. 17/497,459, filed 8 Oct. 2021, the entire contents of which is incorporated herein by reference.

TECHNICAL FIELD

This disclosure relates to computer networks, and more specifically, to management of applications running on computing devices within a network.

BACKGROUND

Enterprise networks, especially large enterprise networks, require significant efforts to maintain and administer. Such networks typically host many different types of applications and systems, each of which may evolve through continual updates, modifications, and bug fixes. In addition, such networks may host the different types of applications and systems on the mainframe and/or at multiple geographically-disparate data centers. One or more centralized tools may be used to monitor and maintain the applications and systems running in remote locations within the enterprise network. The centralized tools may include a software patch manager configured to push software patches including the updates, modifications, and/or bug fixes to the appropriate applications and systems. The centralized tools may also include one or more enterprise monitoring tools configured to perform application discovery and/or build recovery plans used to respond to adverse events (e.g., application or data center failures).

SUMMARY

This disclosure describes an enterprise network including a centralized application management system configured to automatically generate digital dog tag files for local storage on each computing device of a plurality of computing devices (e.g., data center servers) within the enterprise network. A digital dog tag file generated for a given server may comprise a minimum viable text file or other file format that includes recovery information for one or more applications hosted on the given server. The recovery information for a respective application may enable decentralized recovery of the respective application either on the given server or on another server within the enterprise network. The recovery information for the respective application may at least include one or more of a service type provided by the respective application, contact information of an application manager for the respective application, and application dependencies comprising resources enabling the respective application to operate.

The application management system may include automation tools configured to periodically retrieve application information for the one or more applications from one or more sources within the enterprise network, periodically generate the digital dog tag file for the given server based on the application information, and send the digital dog tag file for local storage at a predefined location on the given server. In some examples, a periodic interval for updating and replacing the contents of the digital dog tag file may be daily, weekly, monthly, or the like. The enterprise network may further include a computing device locally connected to the plurality of servers within a data center. In response to a failure within the enterprise network, the computing device is configured to access the given server that includes the digital dog tag file, read the digital dog tag file from the given server, and instruct recovery of at least one application based on the recovery information included in the digital dog tag file for the given server.

The techniques described in this disclosure provide one or more technical advantages and practical applications. For example, conventional tools for application discovery and/or recovery plan generation and execution comprise centralized tools that require remote access to data centers of the enterprise network. In scenarios involving a single point of failure, a network outage, or loss of remote access to the data centers, the centralized tools may be unavailable or inaccessible, and thus unusable for application recovery after the failure. According to the disclosed techniques, a centralized application management system uses automation tools to automatically generate digital dog tag files for local storage on one or more servers within each data center of the enterprise network. The digital dog tag files are generated to at least include the minimum amount of information needed to reestablish or recover applications that were running on the servers. Such a digital dog tag file may be useful in the scenarios described above where an existing centralized tool is unavailable or inaccessible. In these scenarios, administrators may use a computing device to locally access the digital dog tag files stored on the servers within the data center and instruct recovery of the applications on the servers within the data center or on servers within another data center in order to quickly resume operation.

In one example, this disclosure is directed to a computing system within an enterprise network, the computing system comprising a storage device and processing circuitry having access to the storage device. The processing circuitry configured to periodically retrieve, from one or more sources within the enterprise network, application information for one or more applications hosted on a given computing device of a plurality of computing devices within the enterprise network; periodically generate, based on the application information, a digital dog tag file for the given computing device that includes recovery information for the one or more applications hosted on the given computing device; and send the digital dog tag file for local storage at a predefined location on the given computing device.

In another example, this disclosure is directed to a method comprising periodically retrieving, by a computing system within an enterprise network and from one or more sources within the enterprise network, application information for one or more applications hosted on a given computing device of a plurality of computing devices within the enterprise network; periodically generating, by the computing system and based on the application information, a digital dog tag file for the given computing device that includes recovery information for the one or more applications hosted on the given computing device; and sending, by the computing system, the digital dog tag file for local storage at a predefined location on the given computing device.

In a further example, this disclosure is directed to a computing device within a data center of an enterprise network, the computing device comprising a storage device, one or more interfaces that are locally connected to each server of a plurality of servers within the data center, and processing circuitry having access to the storage device. The processing circuitry configured to: in response to a failure within the enterprise network, access, over one of the interfaces, at least one server of the plurality of servers that includes a digital dog tag file stored at a predefined location on the server, wherein the digital dog tag file for the server includes recovery information for one or more applications hosted on the server; read the digital dog tag file from the predefined location on the server; and instruct recovery of at least one application of the one or more applications hosted on the server based on the recovery information included in the digital dog tag file for the server.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
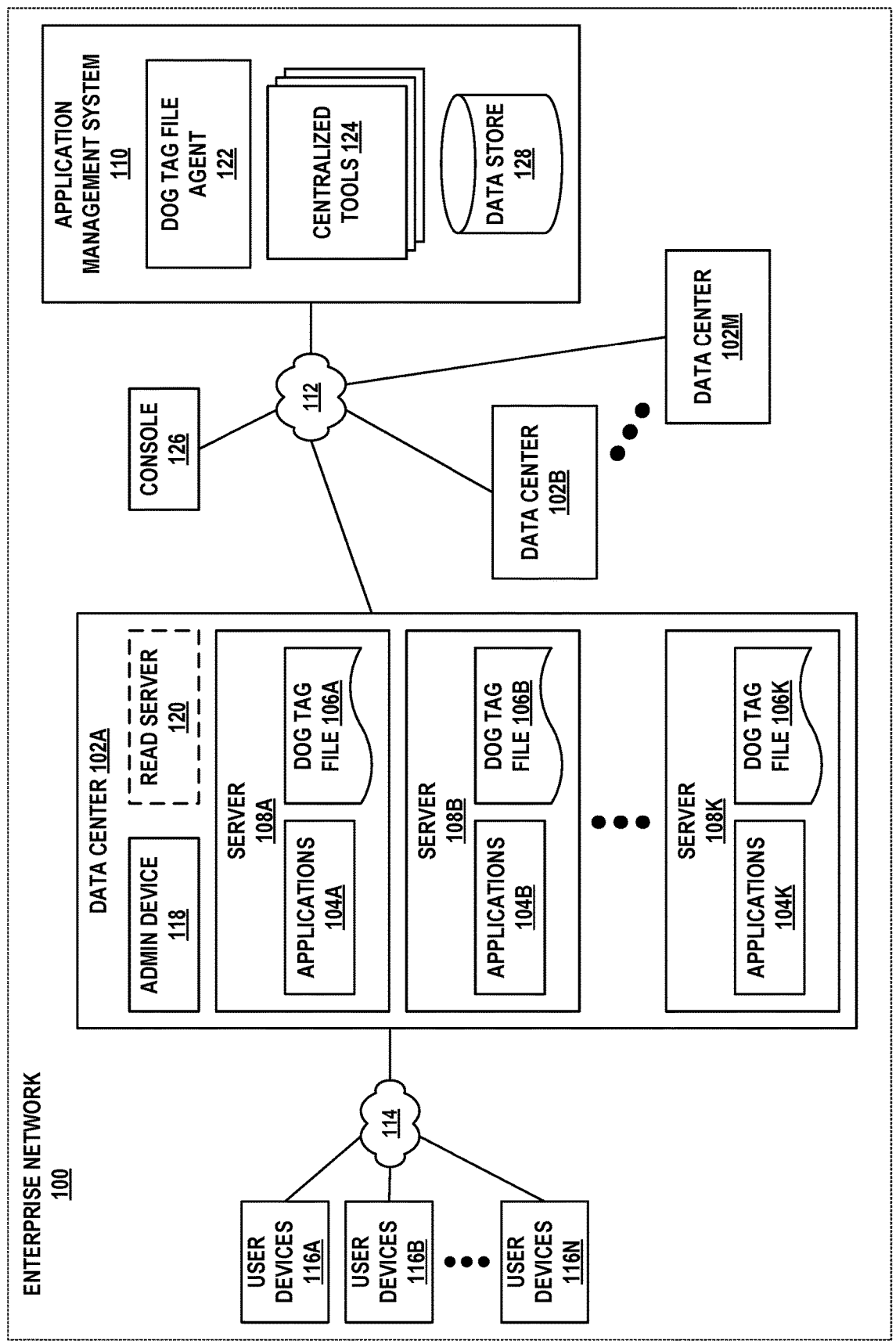
FIG. 1 is a block diagram illustrating an example enterprise network including a centralized application management system configured to generate digital dog tag files for local storage on each computing device of a plurality of computing devices within the enterprise network, in accordance with one or more aspects of the present disclosure.

FIG. 1 is a block diagram illustrating an example enterprise network 100 including a centralized application management system 110 configured to generate digital dog tag files for local storage on each computing device of a plurality of computing devices within enterprise network 100, in accordance with one or more aspects of the present disclosure. Enterprise network 100 may be a large-scale enterprise network used or administered by a large organization, such as a financial institution, bank, medical facility, or other type of large organization, which will commonly rely on significant computing resources. For some large organizations, the required computing resources are provided through multiple data centers deployed within the enterprise network.

Accordingly, as illustrated in FIG. 1, enterprise network 100 is generally characterized by multiple data centers 102A-102M (collectively, "data centers 102") and centralized application management system 110. Computing devices within each of data centers 102 may host enterprise applications, and provide a platform for execution of applications and services provided to users of user devices 116A-116N (collectively, "user devices 116"). User devices 116 may interact with data centers 102 through network 114. One or more client devices 116 may be operated by users of enterprise network 100, and may access functionality of enterprise network 100, generally provided by data centers 102. In some examples, each of data centers 102 may be located in a geographically-disparate location in order to provide high-speed services to user devices 116 in the same geographic location.

Application management system 110 comprises a computing system configured to execute one or more tools to perform application discovery and/or recovery plan generation and execution with respect to the applications hosted on the computing devices within each of data centers 102. As illustrated in FIG. 1, application management system 110 includes a dog tag file agent 122, one or more centralized tools 124, and an enterprise data store 128. Application management system 110 may interact with data centers 102 through network 112. As each of data centers 102 may be located in a geographically-disparate location, application management system 110 typically requires Internet Service Provider (ISP) connectivity to gain remote access to data centers 102 via network 112.

Each of the networks illustrated in FIG. 1 (e.g., network 114 and network 112) may include or represent any public or private communications network or other network. One or more client devices, server devices, or other devices may transmit and receive data, commands, control signals, and/or other information across such networks using any suitable communication techniques. In some examples, network 114 or network 112 may be a separate network, as illustrated in FIG. 1, or one or more of such networks may be a subnetwork of another network. In other examples, two or more of such networks may be combined into a single network; further, one or more of such networks may be, or may be part of, the Internet. Accordingly, one or more of the devices or systems illustrated in FIG. 1 may be in a remote location relative to one or more other illustrated devices or systems. Networks 114 and 112 illustrated in FIG. 1 may include one or more network hubs, network switches, network routers, network links, satellite dishes, or any other network equipment. Such devices or components may be operatively inter-coupled, thereby providing for the exchange of information between computers, devices, or other components (e.g., between one or more user devices or systems and one or more server devices or systems).

In accordance with the disclosed techniques, data center 102A includes one or more computing devices, e.g., servers 108A-108K (collectively, "servers 108"), configured to execute sets of applications 104A-104K (collectively, "applications 104") and store digital dog tag files 106A-106K (collectively, "dog tag files 106"). In addition, data center 102A includes an administrator device 118 and in some examples a dedicated read server 120, each of which may comprise a computing device having interfaces that are locally connected to each of servers 108 within data center 102A. For ease of illustration, only the applications 104 and dog tag files 106 within servers 108, the admin device 118, and the read server 120 of data center 102A are illustrated in FIG. 1. It should be understood that similar sets of computing devices and servers executing applications and storing digital dog tag files may be included within each of data centers 102B-102M.

Application management system 110 may receive interactions from console 126 via network 112 and may perform functions in response to input received from console 126. Application management system 110 and/or tools running within application management system 110 may communicate with and/or have access to enterprise data store 128. Enterprise data store 128 may represent any suitable data structure or storage medium for storing information related to enterprise network 100 or systems, devices, or applications included within enterprise network 100. In some examples, enterprise data store 128 may represent a system of record associated with an enterprise network 100, which may serve as an authoritative data source for at least some data pertaining to enterprise network 100, or pertaining to the operations of the business, organization, or other entity that administers enterprise network 100.

In some examples, enterprise data store 128 may be updated and/or maintained by application management system 110. The information stored in enterprise data store 128 may be searchable and/or categorized such that one or more tools within application management system 110 may provide an input requesting information from enterprise data store 128, and in response to the input, receive information stored within enterprise data store 128. Enterprise data store 128 may include one or more application information records, and in some examples one or more customer-facing services records. In some examples, as illustrated in FIG. 1, aspects of enterprise data store 128 may be included within application management system 110. In other examples, some or all of enterprise data store 128 may be accessed through a separate system and/or network 112.

In operation, application management system 110 receives information for an application, e.g., one of applications 104A, that is deployed, stored, and/or executing within one or more data centers 102. For instance, for an enterprise that has multiple lines of business, each line of business may develop applications for execution on the shared enterprise network 100 (e.g., within one or more of data centers 102) used by each line of business within the enterprise. Typically, each such line of business is responsible for maintaining certain information for any applications that are used by that line of business from sunrise of the application (initial development of the application) to sunset of the application (phasing out or shutting down of redundant or obsolete business applications).

For instance, each line of business may maintain, for each application, a service type provided by the application (e.g., whether it is a customer-facing service, a front-end service, a back-end service, or the like), contact information of a list of application managers for the respective application (e.g., email addresses or phone numbers), and/or a list of resources needed by the application for proper performance (e.g., CPU, memory, and other resource requirements). Each line of business may also maintain a list of application dependencies (e.g., data required, internal hardware, software, and/or databases required for operation) that the enterprise application relies upon to operate effectively and perform services on behalf of user devices 116. Finally, each line of business may also maintain further information about the enterprise application, including how it is deployed, usage patterns, and/or historical information. Maintenance of such information may involve creating and updating one or more application information records included within enterprise data store 128 for enterprise network 100 illustrated in FIG. 1.

In some examples, each line of business may further maintain, for each application, an indication of the criticality of the application and/or of the service provided by the application. For example, the indication may comprise a recovery time objective (RTO) of the application, which may range from 0 being most critical and 10 being least critical. In some further examples, each line of business may further maintain information on customer-facing services comprising an ordered list of two or more enterprise applications that are used to perform a given customer-facing service. For example, for the given customer-facing service, the ordered list may indicate a customer route or customer journey through the two or more enterprise applications.

Application management system 110 may receive information about applications from the line of business or other source through console 126, or through another channel or system. As changes, modifications, or updates to enterprise applications are made, application management system 110 may receive further information about the one of enterprise applications 104A. As the enterprise application evolves during its lifecycle, application management system 110 may use such further information to update enterprise data store 128, and may include some or all of such information within the application information records and/or the customer-facing services records. Accordingly, in some examples, a business or other entity may maintain enterprise data store 128 and keep within enterprise data store 128 up-to-date information about some or all of the many enterprise applications that may execute within data centers 102.

When enterprise applications 104A are deployed and in use, e.g., within server 108A of data center 102A, enterprise applications 104A are accessible to one or more of user devices 116 that may request that enterprise applications 104A perform services on their behalf. For instance, in one example, one or more of user devices 116 may interact with server 108A executing enterprise applications 104A within data center 102A. At least one of enterprise applications 104A may receive one or more indications of input that it determines correspond to input from a user of a user device, e.g., user device 116A. In response to the input, the one of enterprise applications 104A causes server 108A to perform operations and services on behalf of the user of client device 116A.

Centralized tools 124 of application management system 110 may include one or more conventional centralized tools used to monitor and maintain the applications and systems running in remote locations within enterprise network 100. In some examples, centralized tools 124 may include a software patch manager configured to push software patches including updates, modifications, and/or bug fixes to the appropriate applications and systems. In other examples, centralized tools 124 may include one or more enterprise monitoring tools configured to perform application discovery and/or recovery plan generation and execution with respect to applications hosted on the computing devices within each of data centers 102, e.g., applications 104 on servers 108 within data center 102A, used to respond to adverse events. For example, after a loss of communication or failed connectivity between data centers 102 (but not between data center 102A and centralized application management system 110), one or more of centralized tools 124 may be used to determine application ownership and recover applications 104 on the servers 108 within the data center 102A through remote access to data center 102A via network 112.

In scenarios involving a single point of failure, a network outage, or loss of remote access to the data centers (e.g., an ISP failure), centralized tools 124 may be unavailable or inaccessible, and thus unusable for application recovery after the failure. Conventionally, without access to centralized tools 124 via network 112, administrators of data centers 102 have no way to know what applications or services each server hosted, application managers for the hosted applications or services, and/or application dependencies enabling the applications or services to operate. As such, until connectivity and remote access are restored between data centers 102 and centralized tools 124 via network 112, recovery of applications or services may be difficult or impossible, resulting in longer downtimes for, in some cases, enterprise-critical, customer-facing services.

According to the techniques described in this disclosure, application management system 110 includes dog tag file agent 122 executing one or more automation tools to automatically generate digital dog tag files for local storage on one or more servers within data centers 102 of enterprise network 100. For example, dog tag file agent 122 automatically generates each of dog tag files 106A-106K for a respective one of servers 108A-108K, and sends or pushes each of dog tag files 106A-106K for local storage on the appropriate one of servers 108A-108K.

As an example, digital dog tag file 106A generated for server 108A may comprise a minimum viable text file or other file format that includes recovery information for one or more applications 104A hosted on server 108A. The recovery information for a respective application of applications 104A may enable decentralized recovery of the respective application either on server 108A or on another server within the enterprise network 100, e.g., another one of servers 108 within data center 102A or another server within one of data centers 102B-102M. The recovery information for the respective application may at least include one or more of a service type provided by the respective application, contact information of an application manager for the respective application, and application dependencies comprising resources enabling the respective application to operate.

To automatically generate digital dog tag file 106A for server 108A, for example, dog tag file agent 122 of application management system 110 executes automation tools configured to periodically retrieve application information for the one or more applications 104A hosted on server 108A from one or more sources within enterprise network 100. Such sources may include one or more of centralized tools 124 and/or enterprise data store 128. Dog tag file agent 122 periodically generates digital dog tag file 106A for server 108A based on the application information. Dog tag file agent 122 then sends the generated digital dog tag file 106A for local storage at a predefined location on server 108A. In some examples, a periodic interval for updating and replacing the contents of digital dog tag file 106A may be daily, weekly, monthly, or the like. The predefined location on server 108A may comprise a common location, e.g., a temp directory or root directory, available on each server.

According to the further techniques described in this disclosure, in response to a failure within enterprise network 110, admin device 118 or read server 120 within data center 102A is configured to access server 108A that includes digital dog tag file 106A stored at the predefined location on server 108A, read digital dog tag file 106A from the predefined location on server 108A, and instruct recovery of at least one application of applications 104A based on the recovery information included in digital dog tag file 106A for server 108A. In some examples, digital dog tag file 106A may be encrypted, included within fields of a security certificate, or otherwise secured. In these examples, read server 120 may initially access sever 108A and read the secured digital dog tag file 106A. Either read server 120 or admin device 118 may then instruct recovery of applications 104A based on the recovery information read from the secured digital dog tag file 106A by read server 120. To instruct recovery of at least one of applications 104A, admin device 118 may output a notification to the administrator indicating the recovery information for use by the administrator to initiate and/or coordinate recovery of applications 104A. In other examples, admin device 118 may be configured to automatically recover applications 104A and automatically contact the administrator or an application manager when manual intervention is needed for the recovery.

Digital dog tag file 106A may be especially useful in the scenarios involving a single point of failure, a network outage, or loss of remote access to data center 102A (e.g., an ISP failure) where existing centralized tools 124 are unavailable or inaccessible. In these scenarios, administrators may use admin device 118 and/or read server 120 to locally access digital dog tag file 106A stored on server 108A and instruct recovery of the applications 104A on servers 108 within the data center 102A or on servers within another of data centers 102B-102M in order to quickly resume operation of, in some cases, enterprise-critical, customer-facing services.

As described above, digital dog tag file 106A is generated to at least include the minimum amount of information needed to reestablish or recover one or more applications 104A that were running on server 108A. In some examples, dog tag file agent 122 may be configured to generate a digital dog tag file that includes additional recovery information for a respective application of applications 104A that is beyond the minimum viable information needed for application recovery. Such additional recovery information may include a recovery prioritization score of the respective application and/or customer-facing service dependencies comprising one or more other applications that are used along with the respective application to perform a given customer-facing service.

In one example, dog tag file agent 122 may determine the recovery prioritization score of the respective application based on an RTO of the respective application retrieved from application information records within enterprise data store 128 and/or based on other application information retrieved from one or more of centralized tools 124. In another example, dog tag file agent 122 may determine the customer-facing service dependencies of the respective application based on customer-facing services records within enterprise data store 128 and/or based on other application information retrieved from one or more of centralized tools 124. In these examples, the additional recovery information for the respective application of applications 104A may enable admin device 118 and/or read server 120 to initiate, coordinate and/or automatically perform a decentralized chain reaction recovery of multiple applications in order of priority and/or in accordance with a customer route or customer journey through the applications for a given customer-facing service.

In the example of FIG. 1, enterprise network 100 might include all of the components shown in FIG. 1. Further, in some examples, an enterprise network may not include dedicated read servers within one or more of the data centers, e.g., read server 120 within data center 102A. The optional nature of read server 120 is indicated through the use of a dashed outline.

Each of the computing systems illustrated in FIG. 1 (e.g., application management system 110, user devices 116, console 126) may represent any suitable computing system, such as one or more server computers, cloud computing systems, mainframes, appliances, desktop computers, laptop computers, mobile devices, and/or any other computing device that may be capable of performing operations in accordance with one or more aspects of the present disclosure. One or more of such devices may perform operations described herein as a result of instructions, stored on a computer-readable storage medium, executing on one or more processors. The instructions may be in the form of software stored on one or more local or remote computer readable storage devices. In other examples, one or more of such computing devices may perform operations using hardware, firmware, or a mixture of hardware, software, and firmware residing in and/or executing at each of such computing devices.

Figure 2:
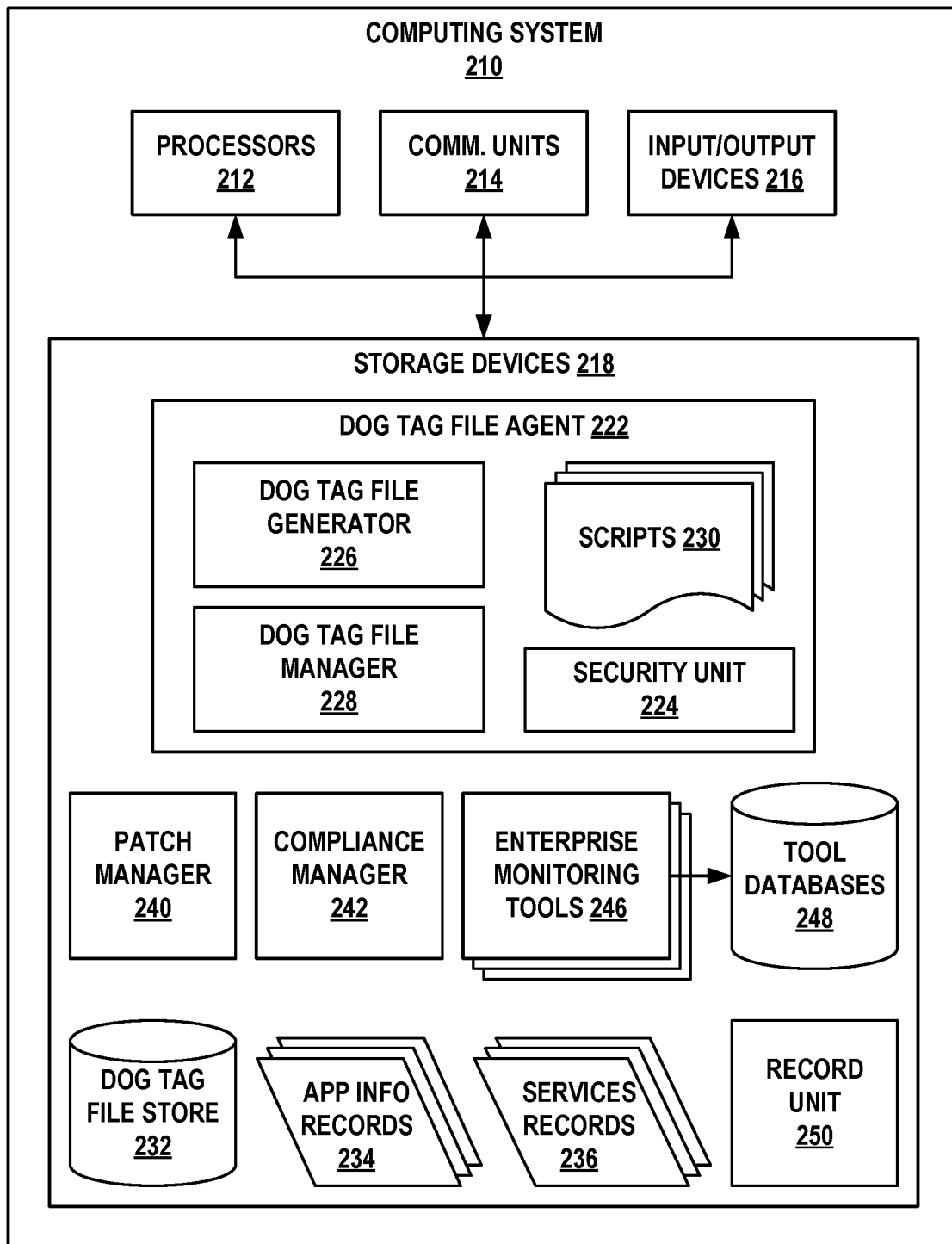
FIG. 2 is a block diagram illustrating an example computing system executing a dog tag file agent configured to generate and push digital dog tag files for local storage on computing devices, in accordance with one or more aspects of the present disclosure.

FIG. 2 is a block diagram illustrating an example computing system 210 executing a dog tag file agent 222 configured to generate and push digital dog tag files for local storage on computing devices, in accordance with one or more aspects of the present disclosure. Computing system 210 may generally correspond to a device that includes and/or implements aspects of the functionality of centralized application management system 110 illustrated in FIG. 1. Accordingly, computing system 210 executing digital dog tag agent 222 may perform some or all of the same functions described in connection with FIG. 1 as being performed by digital dog tag agent 122 within centralized application management system 110.

Computing system 210 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 210 represents a cloud computing system, server farm, and/or server cluster (or portion thereof) that provides services to client devices and other devices or systems.

Although computing system 210 of FIG. 2 is illustrated as a stand-alone device, in other examples computing system 210 may be implemented in any of a wide variety of ways, and may be implemented using multiple devices and/or systems. In some examples, computing system 210 may be, or may be part of, any component, device, or system that includes a processor or other suitable computing environment for processing information or executing software instructions and that operates in accordance with one or more aspects of the present disclosure. In some examples, computing system 210 may be fully implemented as hardware in one or more devices or logic elements.

In the example of FIG. 2, computing system 210 may include one or more processors 212, one or more communication units 214, one or more input/output devices 216, and one or more storage devices 218. Storage devices 218 may include dog tag file agent 222 including a security unit 224, a dog tag file generator 226, a dog tag file manager 228, one or more scripts 230. Storage devices 218 may further include a record unit 250 configured to maintain one or more of a dog tag file store 232, one or more application information records 234, and one or more customer-facing services records 236. In the illustrated example, storage devices 218 also include one or more centralized tools, e.g., centralized tools 124 from FIG. 1, including a patch manager 240, a compliance manager 242, and one or more enterprise monitoring tools 246 having corresponding tool databases 248. One or more of the devices, modules, storage areas, or other components of computing system 210 may be interconnected to enable inter-component communications (physically, communicatively, and/or operatively). In some examples, such connectivity may be provided by through communication channels, a system bus, a network connection, an inter-process communication data structure, or any other method for communicating data. A power source (not shown) is provide power to one or more components of computing system 210. In some examples, the power source may receive power from the primary alternative current (AC) power supply in a commercial building or data center, where some or all of an enterprise network may reside. In other examples, the power source may be or may include a battery.

One or more processors 212 of computing system 210 may implement functionality and/or execute instructions associated with computing system 210 associated with one or more modules illustrated herein and/or described below. One or more processors 212 may be, may be part of, and/or may include processing circuitry that performs operations in accordance with one or more aspects of the present disclosure. Examples of processors 212 include microprocessors, application processors, display controllers, auxiliary processors, one or more sensor hubs, and any other hardware configured to function as a processor, a processing unit, or a processing device. Computing system 210 may use one or more processors 212 to perform operations in accordance with one or more aspects of the present disclosure using software, hardware, firmware, or a mixture of hardware, software, and firmware residing in and/or executing at computing system 210.

One or more communication units 214 of computing system 210 may communicate with devices external to computing system 210 by transmitting and/or receiving data, and may operate, in some respects, as both an input device and an output device. In some examples, communication units 214 may communicate with other devices over a network. In other examples, communication units 214 may send and/or receive radio signals on a radio network such as a cellular radio network. In other examples, communication units 214 of computing system 210 may transmit and/or receive satellite signals on a satellite network such as a Global Positioning System (GPS) network. Examples of communication units 214 include a network interface card (e.g., such as an Ethernet card), an optical transceiver, a radio frequency transceiver, a GPS receiver, or any other type of device that can send and/or receive information. Other examples of communication units 214 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input/output devices 216 may represent any input or output devices of computing system 210 not otherwise separately described herein. One or more input/output devices 216 may generate, receive, and/or process input from any type of device capable of detecting input from a human or machine. One or more input/output devices 216 may generate, present, and/or process output through any type of device capable of producing output.

One or more storage devices 218 within computing system 210 may store information for processing during operation of computing system 210. Storage devices 218 may store program instructions and/or data associated with one or more of the modules described in accordance with one or more aspects of this disclosure. One or more processors 212 and one or more storage devices 218 may provide an operating environment or platform for such modules, which may be implemented as software, but may in some examples include any combination of hardware, firmware, and software. One or more processors 212 may execute instructions and one or more storage devices 218 may store instructions and/or data of one or more modules. The combination of processors 212 and storage devices 218 may retrieve, store, and/or execute the instructions and/or data of one or more applications, modules, or software. Processors 212 and/or storage devices 218 may also be operably coupled to one or more other software and/or hardware components, including, but not limited to, one or more of the components of computing system 210 and/or one or more devices or systems illustrated as being connected to computing system 210.

In some examples, one or more storage devices 218 are temporary memories, meaning that a primary purpose of the one or more storage devices is not long-term storage. Storage devices 218 of computing system 210 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 218, in some examples, also include one or more computer-readable storage media. Storage devices 218 may be configured to store larger amounts of information than volatile memory. Storage devices 218 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories.

According to the disclosed techniques, computing system 210 comprises a centralized application management system of an enterprise network that has remote access to one or more data centers of the enterprise network. Computing system 210 includes dog tag file agent 222 configured to automatically generate digital dog tag files for local storage on each computing device of a plurality of computing devices (e.g., data center servers) within the enterprise network. Upon generating the digital dog tag files for each of the computing devices, dog tag file agent 222 may record the digital dog tag files in dog tag file store 232, which may be maintained within an enterprise data store, e.g., data store 128 from FIG. 1.

A digital dog tag file generated for a respective server includes recovery information comprising at least a minimum amount of information needed to reestablish or recover one or more applications after a failure within the enterprise network. Such a digital dog tag file may be useful in situations where, after the failure, one or more centralized tools are unavailable or inaccessible due to a single point of failure, network outage, or loss of remote access to one or more data centers. In these situations, an administrator may use a computing device locally connected to the servers at the data center to access the digital dog tag files from the servers and instruct recovery of one or more applications based on the recovery information included in the digital dog tag files.

In addition, computing system 210 includes numerous centralized tools used to monitor and maintain the applications hosted on the computing devices within each of the data centers of the enterprise network. As illustrated, computing system 210 including patch manager 240, compliance manager 242, and one or more enterprise monitoring tools 246. Patch manager 240 is configured to push software patches including updates, modifications, and/or bug fixes to the appropriate applications hosted on the computing devices within each of the data centers. Compliance manager 242 is configured to perform a vulnerability scan of the applications hosted on the computing devices within each of the data centers to verify whether the applications are running the latest version and/or are in compliance with security policies. Enterprise monitoring tools 246 are configured to perform application discovery and/or recovery plan generation and execution with respect to the applications hosted on the computing devices within each of data centers. In some examples, one or more of enterprise monitoring tools 246 may export, record, or otherwise store output in tool databases 248. Although illustrated in FIG. 2 as being included within computing system 210, in other examples, one or more of patch manager 240, compliance manager 242, enterprise monitoring tools 246, and tool databases 248 may be accessible to computing system 210 through a separate system.

In some examples, record unit 250 may perform functions relating to maintaining, updating, and interacting with the enterprise data store. Record unit 250 may maintain application information records 234 and customer-facing services records 236 within the enterprise data store, and may update application information records 234, customer-facing services records 236, and/or the enterprise data store in response to input. For instance, record unit 250 may receive input from a computing device associated with one or more lines of business. Record unit 250 may determine that the input corresponds to information about one or more enterprise applications administered, developed, or updated by such lines of business. Record unit 250 may also receive input from a console, e.g., console 126 from FIG. 1, or from another source. Record unit 250 may update application information records 234, customer-facing services records 236, and/or the enterprise data store as enterprise applications are modified, further developed, or otherwise evolved. Although illustrated in FIG. 2 as being included within computing system 210, in other examples, application information records 234, customer-facing services records 236 and/or other aspects of the enterprise data store may be accessible to computing system 210 through a separate system.

Application information records 234 may represent one or more files, records, or other storage units that include information about any changes, modifications, or updates that are made to enterprise applications. Application information records 234 may be primarily maintained by record unit 250 so that each of application information records 234 includes relatively up-to-date information about its corresponding application; such information may include a service type provided by the corresponding application, contact information of an application manager for the corresponding application, and/or application dependencies comprising resources enabling the corresponding application to operate. In some examples, the information within each of application information records 234 about its corresponding application may further include an indication of the criticality of the corresponding application and/or of the service type provided by the corresponding application. As one example, the criticality indication may take the form of a recovery time objective (RTO) of the corresponding application, which may range from 0 being most critical and 10 being least critical.

Customer-facing services records 236 may represent one or more files, records, or other storage units that include information about a customer route or customer journey through two or more enterprise application for customer-facing services provided by the enterprise. Customer-facing services records 236 may be primarily maintained by record unit 250 so that each of customer-facing services records 236 includes relatively up-to-date information about its corresponding customer-facing service; such information may include an ordered list of two or more enterprise applications that are used to perform the corresponding customer-facing service and information identifying a location of each of the associated applications within the enterprise network.

Returning to dog tag file agent 222, to generate a digital dog tag file for a given server within a data center, dog tag file generator 226 periodically retrieves application information for one or more applications that are hosted on the given server from one or more sources. In some examples, dog tag file generator 226 may comprise automation tools that execute instructions included in one or more scripts 230 to automatically access each of the sources, identify the application information for a respective application at the respective source, and extract specific types of application information for the respective application from the respective source.

As one example, dog tag file generator 226 may run one of scripts 230 to crawl application information records 234 maintained within the enterprise data store or system of record. As another example, dog tag file generator 226 may run another one of scripts 230 to crawl one of enterprise monitoring tools 246. As a further example, dog tag file generator 226 may run one or more of scripts 230 to request an export file (e.g., a text (.txt) file or a comma-separated values (.csv) file) from one of enterprise monitoring tools 246, and then crawl or parse the export file, which may be stored in tool databases 248. In a specific example, dog tag file generator 226 may run one or more of scripts 230 to access one of enterprise monitoring tools 246 that uses domain name system (DNS) lookup to determine where applications are running and stores a history of application locations with timestamps in one of tool databases 248, and crawl or parse the one of tool databases 248.

Dog tag file generator 226 periodically generates the digital dog tag file for the given server based on the application information retrieved from the sources. A periodic interval for updating and replacing the contents of the digital dog tag file may be daily, weekly, monthly, or the like. In some examples, dog tag file generator 226 may generate a new or updated digital dog tag file for the given server in response to a "on demand" or other point-in-time update request that occurs outside of the scheduled periodic updates. Dog tag file generator 226 may comprise automation tools that execute instructions included in one or more scripts 230 to automatically aggregate the application information extracted from the one or more sources for the respective application into the recovery information for the respective application, and format the recovery information for the respective application in an application entry for the respective application in the digital dog tag file for the given server.

For the respective application, dog tag file generator 226 may aggregate the retrieved application information into recovery information that at least includes the minimum amount of information needed to recover the respective application. For example, the recovery information for the respective application at least includes a service type provided by the respective application, contact information (e.g., email addresses or phone numbers) of one or more application managers for the respective application, and application dependencies comprising resources (e.g., data, internal hardware, software, and/or databases) enabling the respective application to operate.

In some examples, dog tag file generator 226 may aggregate additional information into the recovery information for the respective application that includes a recovery prioritization score of the respective application and/or customer-facing service dependencies comprising one or more other applications that are used along with the respective application to perform a given customer-facing service. In one example, dog tag file generator 226 may determine the recovery prioritization score of the respective application based on an RTO of the respective application retrieved from application information records 234 and/or based on other application information retrieved from one or more of enterprise monitoring tools 246. In another example, dog tag file generator 226 may determine the customer-facing service dependencies of the respective application based on customer-facing services records 236 and/or based on other application information retrieved from one or more of enterprise monitoring tools 246.

As one example, dog tag file generator 226 may run one of scripts 230 to format the recovery information for the one or more applications into the digital dog tag file for the given server as one of a text (.txt) file or a comma-separated values (.csv) file. In one specific example, for Red Hat® servers, dog tag file generator 226 may run one of scripts 230 to create a meta Red Hat Package Manager (RPM) as the digital dog tag file for the given server where the meta RPM includes no content but does indicate "what it was" and "what it needed" prior to failure. As another specific example, for Linux® servers, dog tag file generator 226 may run another one of scripts 230 to take a snapshot of the server stack of the given server, e.g., what is running on the server, and include that in the digital dog tag file.

Upon generating the digital dog tag file for the given server, dog tag file generator 226 may record the digital dog tag file in dog tag file store 232. In some examples, the automation tools of dog tag file generator 226 may be scripted to generate digital dog tag files for all servers across the enterprise network or in some portion (e.g., 90%, 80%, 75% or the like) of servers.

Dog tag file manager 228 may then send the digital dog tag file for local storage at a predefined location on the given server at each periodic interval. Dog tag file manager 228 may comprise automation tools that execute instructions included in one or more scripts 230 to automatically send the digital dog tag file to the appropriate server. As one example, dog tag file manager 228 may run one of scripts 230 to push a new digital dog tag file generated at each periodic interval to the given server to replace an existing digital dog tag file locally stored at the predefined location on the given server. In some examples, dog tag file manager 228 may invoke path manager 240 to push the digital dog tag files in a similar manner as software patches. As another example, dog tag file manager 228 may run one of scripts 230 to automatically rewrite an existing digital dog tag file locally stored at the predefined location on the given server with updated recovery information for the one or more applications hosted on the given server. In some additional examples, after each periodic update of the digital dog tag files for servers within one or more data centers, dog tag file manager 228 may invoke compliance manager 242 to scan the digital dog tag files to determine whether each of the servers has the latest version of their respective digital dog tag file. Compliance manager 242 may perform such a scan in a similar manner as vulnerability scans.

In some scenarios, prior to sending the digital dog tag file for local storage on the given server, security unit 224 may encrypt or otherwise secure the digital dog tag file. In one example, security unit 224 may use a public-private key pair to encrypt the digital dog tag file for the given server such that only a dedicated read server locally connected to the given server within the data center may read the recovery information included in the digital dog tag file. In another example, security unit 224 may include the recovery information of the digital dog tag file for the given server within fields of a security certificate generated by a certificate management system.

Modules illustrated in FIG. 2 (e.g., dog tag file agent 222, security unit 224, dog tag file generator 226, dog tag file manager 228, patch manager 240, compliance manager 242, enterprise monitoring tools 246, record unit 250) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
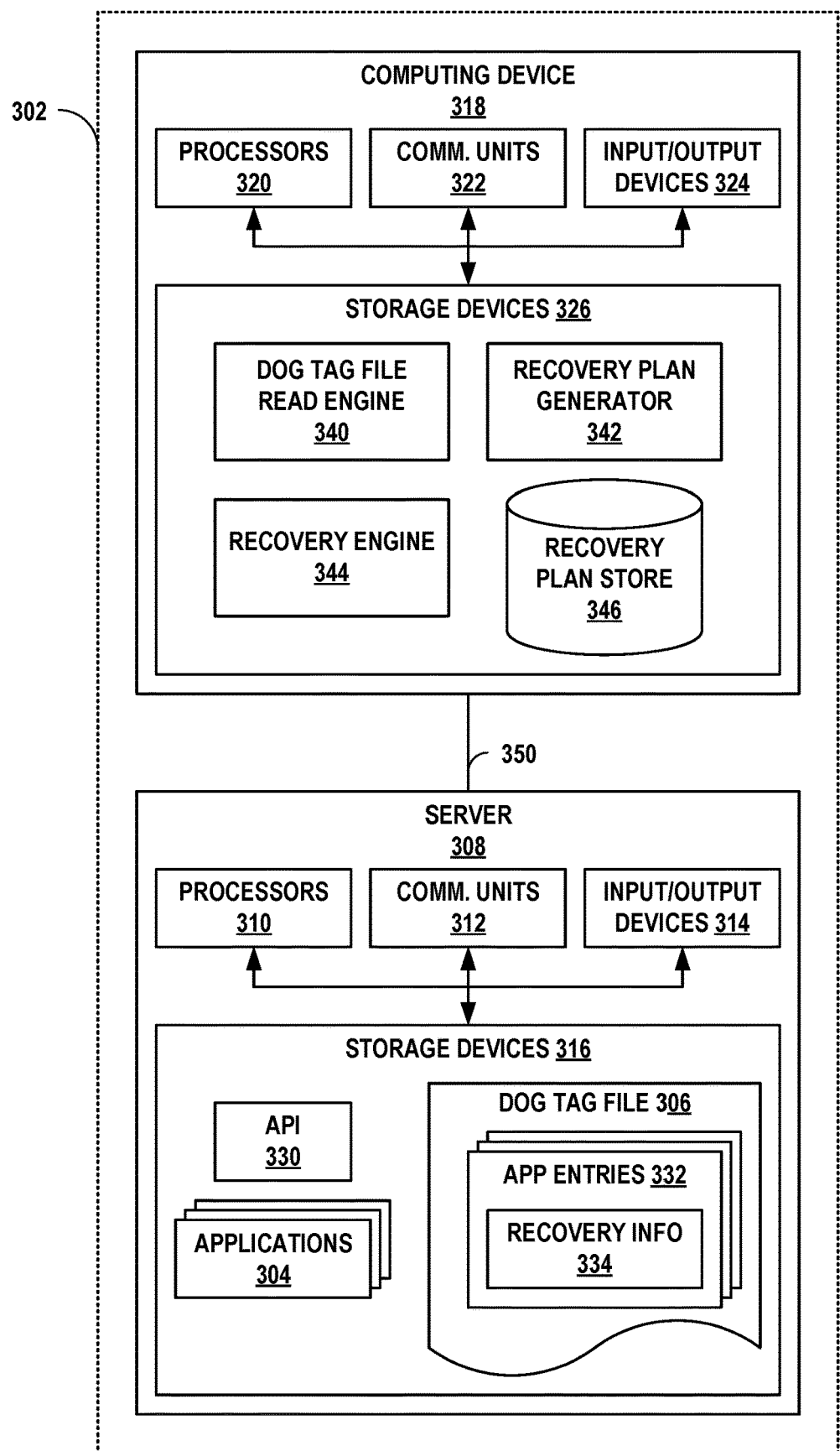
FIG. 3 is a block diagram illustrating a portion of a data center including a server having a locally stored digital dog tag file and a computing device configured to read the digital dog tag file, in accordance with one or more aspects of the present disclosure.

FIG. 3 is a block diagram illustrating a portion of a data center 302 including a server 308 having a locally stored digital dog tag file 306 and a computing device 318 configured to read the digital dog tag file, in accordance with one or more aspects of the present disclosure. Server 308 may generally correspond any of servers 108 of data center 102A or other servers within any of data centers 102B-102K from FIG. 1. Computing device 318 may generally correspond to any of admin device 118 or read servers 120 from FIG. 1.

Server 308 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, server 308 may comprise a server within a data center, cloud computing system, server farm, and/or server cluster (or portion thereof) that provides services to client devices and other devices or systems. For example, server 308 may host or provide access to services provided by one or more applications 304 running on server 308. Computing device 318 may be implemented as any suitable computing device, such as a desktop computer, laptop computer, mobile device, and/or any other computing device that may be capable of performing operations and/or functions described in accordance with one or more aspects of the present disclosure.

Although server 308 and computing device 318 of FIG. 3 are each illustrated as a stand-alone device, in other examples server 308 and/or computing device 318 may be implemented in any of a wide variety of ways, and may be implemented using multiple devices and/or systems. In some examples, server 308 and/or computing device 318 may be, or may be part of, any component, device, or system that includes a processor or other suitable computing environment for processing information or executing software instructions and that operates in accordance with one or more aspects of the present disclosure. In some examples, server 308 and/or computing device 318 may be fully implemented as hardware in one or more devices or logic elements.

In the example of FIG. 3, server 308 may include one or more processors 310, one or more communication units 312, one or more input/output devices 314, and one or more storage devices 316. Storage devices 316 may include applications 304, a dog tag file 306, and an application programming interface (API) 330. Computing device 318 may include one or more processors 320, one or more communication units 322, one or more input/output devices 324, and one or more storage devices 326. Storage devices 326 may include dog tag file read engine 340, recovery plan generator 342, recovery engine 344, and recovery plan store 346.

One or more of the devices, modules, storage areas, or other components within each of server 308 and computing device 318 may be interconnected to enable inter-component communications (physically, communicatively, and/or operatively). In some examples, such connectivity may be provided by through communication channels, a system bus, a network connection, an inter-process communication data structure, or any other method for communicating data. A power source (not shown) is provide power to one or more components within each of server 308 and computing device 318. In some examples, the power source may receive power from the primary alternative current (AC) power supply in a commercial building or data center, where some or all of an enterprise network may reside. In other examples, the power source may be or may include a battery.

One or more processors 310, 320 may implement functionality and/or execute instructions associated with server 308 and computing device 318, respectively, associated with one or more modules illustrated herein and/or described below. One or more processors 310, 320 may be, may be part of, and/or may include processing circuitry that performs operations in accordance with one or more aspects of the present disclosure. Examples of processors 310, 320 include microprocessors, application processors, display controllers, auxiliary processors, one or more sensor hubs, and any other hardware configured to function as a processor, a processing unit, or a processing device. Server 308 and computing device 318 may respectively use one or more processors 310, 320 to perform operations in accordance with one or more aspects of the present disclosure using software, hardware, firmware, or a mixture of hardware, software, and firmware residing in and/or executing at server 308 and computing device 318.

One or more communication units 312, 322 of server 308 and computing device 318, respectively, may communicate with devices external to server 308 and computing device 318 by transmitting and/or receiving data, and may operate, in some respects, as both an input device and an output device. In some examples, communication units 312, 322 may communicate with other devices over a network. In other examples, communication units 312, 322 may send and/or receive radio signals on a radio network such as a cellular radio network. In other examples, communication units 312, 322 may transmit and/or receive satellite signals on a satellite network such as a GPS network. Examples of communication units 312, 322 include a network interface card (e.g., such as an Ethernet card), an optical transceiver, a radio frequency transceiver, a GPS receiver, or any other type of device that can send and/or receive information. Other examples of communication units 312, 322 may include devices capable of communicating over Bluetooth®, GPS, NFC, ZigBee, and cellular networks (e.g., 3G, 4G, 5G), and Wi-Fi® radios found in mobile devices as well as USB controllers and the like. Such communications may adhere to, implement, or abide by appropriate protocols, including TCP/IP, Ethernet, Bluetooth, NFC, or other technologies or protocols.

One or more input/output devices 314, 324 may represent any input or output devices of server 308 and computing device 318, respectively, not otherwise separately described herein. One or more input/output devices 314, 324 may generate, receive, and/or process input from any type of device capable of detecting input from a human or machine. One or more input/output devices 314, 324 may generate, present, and/or process output through any type of device capable of producing output.

One or more storage devices 316, 326 of server 308 and computing device 318, respectively, may store information for processing during operation of server 308 and computing device 318. Storage devices 316, 326 may store program instructions and/or data associated with one or more of the modules described in accordance with one or more aspects of this disclosure. One or more processors 310, 320 and one or more storage devices 316, 326, respectively, may provide an operating environment or platform for such modules, which may be implemented as software, but may in some examples include any combination of hardware, firmware, and software. One or more processors 310, 320 may execute instructions and one or more storage devices 316, 326, respectively, may store instructions and/or data of one or more modules. The combination of processors 310, 320 and storage devices 316, 326, respectively, may retrieve, store, and/or execute the instructions and/or data of one or more applications, modules, or software. Processors 310, 320 and/or storage devices 316, 326, respectively, may also be operably coupled to one or more other software and/or hardware components, including, but not limited to, one or more of the components of server 308 and computing device 318, respectively, and/or one or more devices or systems illustrated as being connected to server 308 and computing device 318.

In some examples, one or more storage devices 316, 326 are temporary memories, meaning that a primary purpose of the one or more storage devices is not long-term storage. Storage devices 316, 326 may be configured for short-term storage of information as volatile memory and therefore not retain stored contents if deactivated. Examples of volatile memories include RAM, DRAM, SRAM, and other forms of volatile memories known in the art. Storage devices 316, 326, in some examples, also include one or more computer-readable storage media. Storage devices 316, 326 may be configured to store larger amounts of information than volatile memory. Storage devices 316, 326 may further be configured for long-term storage of information as non-volatile memory space and retain information after activate/off cycles. Examples of non-volatile memories include magnetic hard disks, optical discs, floppy disks, Flash memories, or forms of EPROM or EEPROM memories.

Server 308 includes one or more enterprise applications 304 and a dog tag file 306 that includes one or more application entries 332, each entry including recovery information 334 for a respective application of one or more applications 304. Each of applications 304 may comprise an instance of a different enterprise application developed by a line of business for execution on a shared enterprise network, e.g., enterprise network 100 from FIG. 1. When applications 304 are deployed and in use, in response to receipt of a request from a user device via communication units 312, processors 310 may execute an appropriate one of applications 304 to perform the requested operations and/or services. One or more of applications 304 may comprise instances of different distributed applications having multiple instances running in geographically-disparate computing devices (e.g., data center servers) of the enterprise network.

According to the disclosed techniques, server 308 may receive digital dog tag file 306 and/or updated application entries 332 of digital dog tag file 306 from a centralized application management system, e.g., application management system 110 from FIG. 1, on a periodic basis. Server 308 may receive the digital dog tag file 306 via communication units 312, API 330, or another interface of server 308. Upon receipt of digital dog tag file 306, server 308 may store digital dog tag file in a predefined location such as a temp directory or root direction of server 308. Recovery information 334 within one of application entries 332 for a respective application of applications 304 may include one or more of a service type provided by the respective application, contact information of an application manager for the respective application, application dependencies comprising resources enabling the respective application to operate, a recovery prioritization score of the respective application, or customer-facing service dependencies comprising one or more other applications that are used along with the respective application to perform a given customer-facing service.

In the illustrated example of FIG. 3, computing device 318 is locally connected to server 308 via cable 350 coupled to a physical interface of communication units 322 of computing device 318 and a physical interface of communication units 312 of server 308. Although not illustrated in FIG. 3, in other examples, computing device 318 may be locally connected to one or more other servers within a same data center as server 308 and computing device 318.

In accordance with the disclosed techniques, in response to a failure within the enterprise network, dog tag file read engine 340 of computing device 318 is configured to access server 308 that includes digital dog tag file 306 stored at the predefined location on server 308 and read digital dog tag file 306 from the predefined location on server 308. In some examples, dog tag file 306 for server 308 may be encrypted or otherwise secured. In these examples, computing device 318 may comprise a dedicated read server with access to public key information or other information to decrypt or otherwise unpack application entries 332 of dog tag file 306.

Dog tag file read engine 340 may comprise automation tools that execute instructions to automatically log into server 308 and retrieve, download, or otherwise access digital dog tag file 306 from the predefined location on server 308. For example, dog tag file read engine 340 may utilize Ansible®, an open-source software tool for automating applications and information technology (IT) infrastructure, to provide this functionality. In some examples, the dog tag file read engine 340 may retrieve digital dog tag file 306 from server 308 prior to a predicted failure or other catastrophic event to ensure that administrators are prepared to recover applications 304 and/or server 308, and in some cases rebuild the data center in case the centralized tools are unavailable or inaccessible after the predicted failure occurs.

Upon accessing and reading digital dog tag file 306 for server 308, recovery engine 344 instructs recovery of at least one application based on recovery information 334 included in digital dog tag file 306 for server 308. In one example, based on recovery information 334 for a respective application of applications 304, recovery engine 344 instructs recovery of at least the respective application on server 308. In another examples, based on recovery information 334 for the respective application, recovery engine 344 may instruct recovery of at least the respective application on another server within the same data center as server 308 or on another server within another data center of the enterprise network.

In one example, recovery engine 344 may instruct recovery of the respective application by outputting a notification to a user of computing device 318, e.g., an administrator of the enterprise network, via one of communication unit 322 or one of input/output devices 324. The notification may indicate a list of application dependencies comprising resources enabling the respective application to operate such that the administrator may initiate recovery or confirm availability of the application dependencies prior to recovering the respective application. The notification may also include contact information of an application manager for the respective application such that the administrator may contact the application manager in the scenario where manual assistance is needed to recover the respective application. In another example, recovery engine 344 may instruct recovery of the respective application by automatically recovering one or more application dependencies of the respective application prior to recovering the respective application. Upon detection of a failure associated with the recovery of the respective application, recovery engine 344 may automatically contact an application manager for the respective application, e.g., via one of communication unit 322 or one of input/output devices 324, to request manual assistance to recover the respective application.

In examples where recovery information 334 for the respective application of applications 304 includes additional information beyond that is beyond the minimum viable information needed for application recovery, recovery engine 344 may initiate, coordinate and/or automatically perform a decentralized chain reaction recovery of multiple applications in order of priority and/or in accordance with a customer route or customer journey through the applications for a given customer-facing service. For example, the additional recovery information may include a recovery prioritization score of the respective application and/or customer-facing service dependencies comprising one or more other applications that are used along with the respective application to perform a given customer-facing service. In some examples, digital dog tag file 306 may comprise an offline cheat sheet that indicates which applications 304 are high priority. In other examples, digital dog tag file 306 may comprise an offline cheat sheet that indicates, for a respective application, one or more upstream and downstream applications within the customer route or customer journey to perform the given customer-facing service. In this way, recovery engine 344 may determine a prioritization order of the respective application based on recovery information 334 included in digital dog tag file 306 for server 308, and instruct recovery of the respective application according to the prioritization order of the respective application with respect to prioritization orders of other applications being recovered.

In some examples, dog tag file read engine 340 may read dog tag file 306 from server 308 and also read other digital dog tag files from multiple other servers within the same data center. Recovery plan generator 342 may then automatically generate one or more recovery plans for one or more of applications 304 running on server 308, each of the other servers within the same data center, and/or all or a majority of the applications running on any of the servers within the data center based on the recovery information included in the digital dog tag files for the servers within the data center. For example, recovery plan generator 342 may identify counterpart applications or application instances of the respective application that are running on other servers within the same data center as server 308 and/or within another data center, and may include the counterpart applications or application instances in the recovery plan for the respective application. The recovery plans may be stored in recovery plan store 346. Recovery engine 344 may then instruct recovery of one or more applications hosted on the servers within the data center according to the one or more recovery plans.

Modules illustrated in FIG. 3 (e.g., applications 304 of server 308, and dog tag file read engine 340, recovery plan generator 342, and recovery engine 344 of computing device 318) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 4:
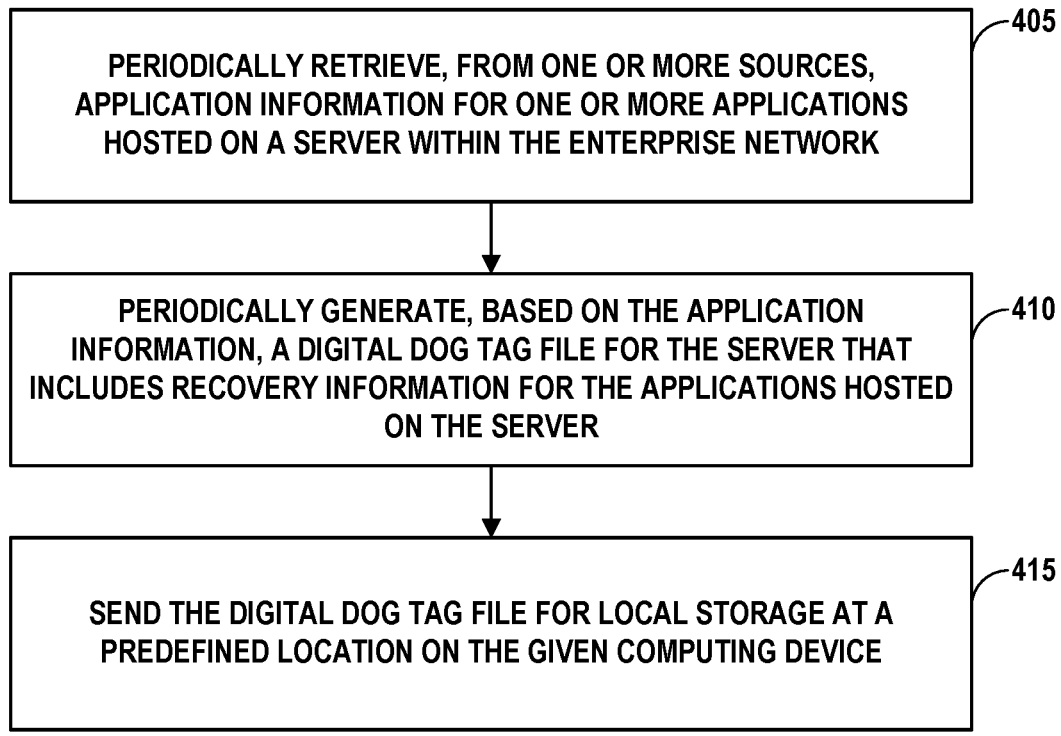
FIG. 4 is a flow diagram illustrating example operations performed by a computing system executing a dog tag file agent, in accordance with one or more aspects of the present disclosure.

FIG. 4 is a flow diagram illustrating example operations performed by a computing system executing a dog tag file agent, in accordance with one or more aspects of the present disclosure. The operations of FIG. 4 are described within the context of computing system 210 executing dog tag file agent 222 from FIG. 2. In other examples, operations described in FIG. 5 may be performed by digital dog tag agent 122 within application management system 110 from FIG. 1, or one or more other components, modules, systems, or devices. Further, in other examples, operations described in connection with FIG. 4 may be merged, performed in a difference sequence, or omitted.

Dog tag file agent 222 of computing system 210 periodically retrieves, from one or more sources within the enterprise network, application information for one or more applications hosted on a given computing device within the enterprise network, e.g., applications 104A hosted on server 108A from FIG. 1 (405). In some examples, dog tag file agent 222 may automatically access each source of the one or more sources including one or more of a system of record within the enterprise network (e.g., enterprise data store 128 from FIG. 1), enterprise monitoring tools 246, or export files from enterprise monitoring tools 246 stored within tool databases 248. Dog tag file agent 222 identifies application information for a given application at each source, and extracts one or more specific types of the application information for the given application from each source.

Dog tag file agent 222 periodically generates, based on the application information, a digital dog tag file for server 108A that includes recovery information for applications 104A hosted on server 108A (410). For example, dog tag file agent 222 may aggregate the application information extracted from the sources for the given application into the recovery information for the given application, and format the recovery information for the given application in an application entry for the given application in the digital dog tag file. In some examples, a periodic interval may comprise one day, one week, one month, or the like. The recovery information for the given application included in the digital dog tag file may include one or more of a service type provided by the given application, contact information of an application manager for the given application, application dependencies comprising resources enabling the given application to operate, a recovery prioritization score of the given application, or customer-facing service dependencies comprising one or more other applications that are used along with the given application to perform a given customer-facing service.

Dog tag file agent 222 then sends the digital dog tag file for local storage at a predefined location on server 108A (415). In some scenarios, dog tag file agent 222 may secure the digital dog tag file for server 108A prior to sending the digital dog tag file for local storage on server 108A. For example, dog tag file agent 222 may encrypt the digital dog tag file or may include the recovery information of the digital dog tag file within a certificate generated by a certificate management system. In some examples, dog tag file agent 222 or patch manager 240 may automatically push a new digital dog tag file to server 108A to replace an existing digital dog tag file 106A locally stored at the predefined location on server 108A. In other examples, dog tag file agent 222 or patch manager 240 may automatically rewrite an existing digital dog tag file 106A locally stored at the predefined location on sever 108A with updated recovery information for applications 104A hosted on server 108A.

Figure 5:
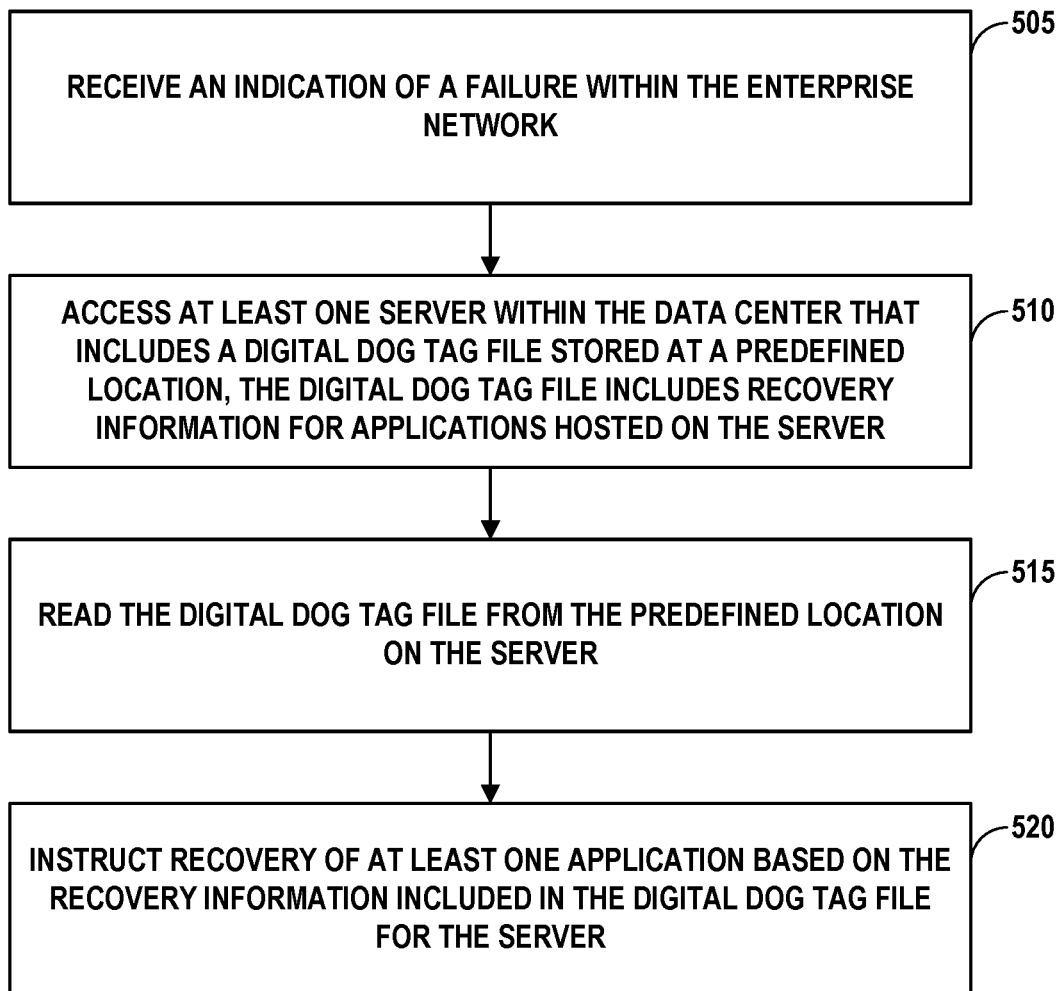
FIG. 5 is a flow diagram illustrating example operations performed by a computing device executing a dog tag file read engine, in accordance with one or more aspects of the present disclosure.

FIG. 5 is a flow diagram illustrating example operations performed by a computing device executing a dog tag file read engine, in accordance with one or more aspects of the present disclosure. The operations of FIG. 5 are described within the context of computing device 318 executing dog tag file read engine 340 from FIG. 3. In other examples, operations described in FIG. 5 may be performed by any of admin device 118 or read servers 120 from FIG. 1, or one or more other components, modules, systems, or devices. Further, in other examples, operations described in connection with FIG. 5 may be merged, performed in a difference sequence, or omitted.

Computing device 318 is locally connected to a plurality of servers within a data center of an enterprise network, e.g., servers 108 of data center 102A from FIG. 1. Computing device 318 receives an indication of a failure within the enterprise network (505). The indication of the failure may be a notification or an error message indicating that a particular application is not operational, that a particular customer-facing service is not operational, and/or that one or more of data centers 102 have lost connectivity or otherwise failed.

In response to the failure, computing device 318 accesses at least one server of the plurality of servers, e.g., server 108A, that includes a digital dog tag file 106A stored at a predefined location on server 108A, where digital dog tag file 106A includes recovery information for one or more applications 104A hosted on server 108A (510). The recovery information for a given application included in digital dog tag file 106A may include one or more of a service type provided by the given application, contact information of an application manager for the given application, application dependencies comprising resources enabling the given application to operate, a recovery prioritization score of the given application, or customer-facing service dependencies comprising one or more other applications that are used along with the given application to perform a given customer-facing service.

Computing device 318 reads the digital dog tag file from the predefined location on server 108A (515). Computing device 318 then instructs recovery of a given application of the one or more applications 104A hosted on server 108A based on the recovery information included in the digital dog tag file 106A for server 108A (520). In some cases, computing device 318 may instruct recovery of at least the given application on server 108A or on another one of servers 108 within data center 102A based on the recovery information included in digital dog tag file 106A for server 108A. In other cases, computing device 318 may instruct recovery of at least the given application on another server within another one data centers 102 of the enterprise network based on the recovery information included in digital dog tag file 106A for server 108A. In some examples, computing device 318 may determine a prioritization order of the given application based on the recovery information included in digital dog tag file 106A for server 108A, and instruct recovery of the given application according to the prioritization order of the given application with respect to prioritization orders of other applications being recovered.

In one example, computing device 318 may instruct recovery of the given application by outputting a notification to a user of computing device 318, e.g., an administrator of the enterprise network, indicating a list of application dependencies comprising resources enabling the given application to operate such that the administrator may initiate recovery or confirm availability of the application dependencies prior to recovering the given application. The notification may also include contact information of an application manager for the given application such that the administrator may contact the application manager in the scenario where manual assistance is needed to recover the given application. In another example, computing device 318 may instruct recovery of the given application by automatically recovering one or more application dependencies of the given application prior to recovering the given application. Upon detection of a failure associated with the recovery of the given application, computing device 318 may automatically contact an application manager for the given application to request manual assistance to recover the given application.

In some scenarios, computing device 318 may be configured to read digital dog tag files 106 from one or more of servers 108 within data center 102A, and automatically generate a recovery plan based on the recovery information included in the digital dog tag files 106 for the one or more of servers 108. Computing device 318 may then instruct recovery of one or more applications 104 hosted on the one or more of servers 108 either within data center 102A or within other data centers 102 according to the recovery plan.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of computer program from one place to another, e.g., according to a communication protocol. In this manner, computer-readable storage media generally may correspond to (1) tangible computer-readable storage media which is non-transitory or (2) a communication media such as signal or carrier wave. Data storage media may be any available media that can be accessed by one or more computers or one or more processing circuits to receive instructs, code and/or data structures for implementation of the techniques described in this disclosure. A computer program product may include a computer-readable medium.

By way of example and not limitation, such computer-readable storage media may include RAM, ROM, EEPROM, CD-ROM, or other optical disk storage, magnetic disk storage, or other magnetic storage devices, flash memory, cache memory, or any other medium that can be used to store desired program code in the form of instructions or store data structures and that can be access by a computer. Also, any connection is a properly termed a computer-readable medium. For example, if instructions are transmitted from a website, server, or other remote source using a coaxial cable, fiber optic cable, twisted pair, digital subscriber line (DSL), or other wireless technologies such as infrared, radio, and microwave, then the coaxial cable, fiber optic cable, twisted pair, DSL, or other wireless technologies such as infrared, radio, and microwave are included in the definition of medium. It should be understood, however, that computer-readable storage media and data storage media do not include connections, carrier waves, signals, or other transient media, but are directed to non-transient, tangible storage media. Disk and disc, as used herein, includes compact disk (CD), laser disc, optical disc, digital versatile disc (DVD), and Blu-ray disc, where disks usually reproduce data magnetically, while discs reproduce data optically with lasers. Combinations of the above should be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor", as used herein may refer to any of the foregoing structure of any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, software systems, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A computing device within a data center of an enterprise network, the computing device comprising:
   a storage device;
   one or more interfaces that are locally connected to each server of a plurality of servers within the data center; and
   processing circuitry having access to the storage device and configured to:
   in response to a failure within the enterprise network, access, over one of the interfaces, a server of the plurality of servers that includes a digital dog tag file stored at a predefined location on the server, wherein the digital dog tag file for the server includes recovery information for one or more applications hosted on the server, and wherein the recovery information for an application of the one or more applications indicates one or more application dependencies comprising resources enabling the application to operate;
read the digital dog tag file from the predefined location on the server; and
instruct recovery of at least one application of the one or more applications hosted on the server based on the recovery information included in the digital dog tag file for the server, wherein to instruct recovery of the at least one application, the processing circuitry is configured to:
   instruct recovery of the one or more application dependencies of the application indicated in the recovery information, and
   after recovery of the one or more application dependencies, instruct recovery of the application.

2. The computing device of claim 1, wherein the recovery information for the application further comprises one or more of a service type provided by the application, contact information of an application manager for the application, a recovery prioritization score of the application, or customer-facing service dependencies comprising one or more other applications that are used along with the application to perform a given customer-facing service.

3. The computing device of claim 1, wherein to instruct recovery of the at least one application, the processing circuitry is configured to:
determine a prioritization order of the application based on the recovery information included in the digital dog tag file for the server; and
instruct recovery of the application according to the prioritization order of the application with respect to prioritization orders of other applications being recovered.

4. The computing device of claim 1, wherein to instruct recovery of the at least one application, the processing circuitry is configured to instruct recovery of the application on another server within another data center of the enterprise network based on the recovery information included in the digital dog tag file for the server.

5. The computing device of claim 1, wherein the processing circuitry is further configured to:
read digital dog tag files from one or more servers of the plurality of servers within the data center;
automatically generate a recovery plan based on the recovery information included in the digital dog tag files for the one or more servers; and
instruct recovery of one or more applications hosted on the one or more servers according to the recovery plan.

6. The computing device of claim 1, wherein to instruct recovery of the at least one application, the processing circuitry is configured to output a notification to a user of the computing device indicating at least one of:
a list of the one or more application dependencies comprising resources enabling the application to operate; or
contact information of an application manager for the application.

7. The computing device of claim 1, wherein to instruct recovery of the at least one application, the processing circuitry is configured to:
automatically recover the one or more application dependencies comprising resources enabling the application to operate;
after recovery of the one or more application dependencies, automatically recover the application; and upon detecting a failure associated with recovery of the application, automatically contact an application manager for the application.

8. The computing device of claim 1, wherein the digital dog tag file stored at the predefined location on the server is encrypted, and wherein to read the encrypted digital dog tag file from the predefined location on the server, the processing circuitry is configured to decrypt the digital dog tag file using public key information.

9. The computing device of claim 1, wherein the digital dog tag file is periodically generated based on application information for the one or more applications hosted on the server by an application management system within the enterprise network that has remote access to the data center, and sent to the server for local storage at the predefined location on the server using the remote access of the application management system to the data center, wherein the failure within the enterprise network comprises a failure that results in loss of the remote access between the application management system and the data center.

10. A method comprising:
in response to a failure within an enterprise network, accessing, by a computing device within a data center of the enterprise network and over at least one interface of one or more interfaces that are locally connected to a plurality of servers within the data center, a server of the plurality of servers that includes a digital dog tag file stored at a predefined location on the server, wherein the digital dog tag file for the server includes recovery information for one or more applications hosted on the server, and wherein the recovery information for an application of the one or more applications indicates one or more application dependencies comprising resources enabling the application to operate;
reading, by the computing device, the digital dog tag file from the predefined location on the server; and
instructing, by the computing device, recovery of at least one application of the one or more applications hosted on the server based on the recovery information included in the digital dog tag file for the server, wherein instructing recovery of the at least one application comprises:
   instructing recovery of the one or more application dependencies of the application indicated in the recovery information, and
   after recovery of the one or more application dependencies, instructing recovery of the application.

11. The method of claim 10, wherein the recovery information for the application further comprises one or more of a service type provided by the application, contact information of an application manager for the application, a recovery prioritization score of the application, or customer-facing service dependencies comprising one or more other applications that are used along with the application to perform a given customer-facing service.

12. The method of claim 10, wherein instructing recovery of the at least one application comprises:
determining a prioritization order of the application based on the recovery information included in the digital dog tag file for the server; and
instructing recovery of the application according to the prioritization order of the application with respect to prioritization orders of other applications being recovered.

13. The method of claim 10, wherein instructing recovery of the at least one application comprises instructing recovery of the application on another server within another data center of the enterprise network based on the recovery information included in the digital dog tag file for the server.

14. The method of claim 10, further comprising:
reading digital dog tag files from one or more servers of the plurality of servers within the data center;
automatically generating a recovery plan based on the recovery information included in the digital dog tag files for the one or more servers; and
instructing recovery of one or more applications hosted on the one or more servers according to the recovery plan.

15. The method of claim 10, wherein instructing recovery of the at least one application comprises outputting a notification to a user of the computing device indicating at least one of:
a list of the one or more application dependencies comprising resources enabling the application to operate; or
contact information of an application manager for the application.

16. The method of claim 10, wherein instructing recovery of the at least one application comprises:
automatically recovering the one or more application dependencies comprising resources enabling the application to operate;
after recovery of the one or more application dependencies, automatically recover the application; and
upon detecting a failure associated with recovery of the application, automatically contacting an application manager for the application.

17. The method of claim 10, wherein the digital dog tag file stored at the predefined location on the server is encrypted, and wherein reading the encrypted digital dog tag file from the predefined location on the server comprises decrypting the digital dog tag file using public key information.

18. The method of claim 10, wherein the digital dog tag file is periodically generated based on application information for the one or more applications hosted on the server by an application management system within the enterprise network that has remote access to the data center, and sent to the server for local storage at the predefined location on the server using the remote access of the application management system to the data center, wherein the failure within the enterprise network comprises a failure that results in loss of the remote access between the application management system and the data center.

19. A computing-readable medium storing instructions that,
when executed, cause one or more processors of a computing device within a data center of an enterprise network to:
in response to a failure within the enterprise network, access, over at least one interface of one or more interfaces that are locally connected to a plurality of servers within the data center, a server of the plurality of servers that includes a digital dog tag file stored at a predefined location on the server, wherein the digital dog tag file for the server includes recovery information for one or more applications hosted on the server, and wherein the recovery information for an application of the one or more applications indicates one or more application dependencies comprising resources enabling the application to operate;
read the digital dog tag file from the predefined location on the server; and
instruct recovery of at least one application of the one or more applications hosted on the server based on the recovery information included in the digital dog tag file for the server, wherein to instruct recovery of the at least one application, the instructions cause the one or more processors to:
instruct recovery of the one or more application dependencies of the application indicated in the recovery information, and
after recovery of the one or more application dependencies, instruct recovery of the application.

* * * * *